(12) United States Patent  (10) Patent No.: US 6,230,838 B1
Adams  (45) Date of Patent: May 15, 2001

(54) RESCUE ASSIST SAFETY SYSTEM

(76) Inventor: Kerry J. Adams, 44 A Hornes Rd., Eastern Passage (CA), B3G-1A5

( * ) Notice: Subject to any disclaimer, the term of this patent is extended or adjusted under 35 U.S.C. 154(b) by 0 days.

(21) Appl. No.: 09/134,128

(22) Filed: Aug. 14, 1998

(51) Int. Cl.[7] .................................................. B60K 28/14
(52) U.S. Cl. ..................... 180/271; 340/604; 200/61.04
(58) Field of Search .................................... 180/268, 271, 180/281, 282; 340/604; 200/61.04, 61.05

(56) References Cited

U.S. PATENT DOCUMENTS

| 4,381,829 | 5/1983 | Montaron | 180/274 |
| 4,785,907 | 11/1988 | Aoki et al. | 180/274 |
| 5,327,990 | 7/1994 | Busquets | 180/271 |
| 5,547,208 | 8/1996 | Chappell et al. | 180/281 |
| 5,574,315 | 11/1996 | Weber | 307/10.1 |

*Primary Examiner*—Paul N. Dickson
(74) *Attorney, Agent, or Firm*—Mario Theriault (57) ABSTRACT

The present invention is an electronic system for automatically rolling down power windows and unlatching power door locks of a motor vehicle in the event of an accident. The electronic system has a vehicle immersion detecting device for triggering an operation thereof. The vehicle immersion detecting device consists of a diode connected to a circuit board in a reverse biased mode. The diode has a pair of lead wires connected to the circuit board. These lead wires are usable for detecting water there-between and for triggering a vehicle immersion condition.

5 Claims, 10 Drawing Sheets

FIG. 1

| FIG. 1A | FIG. 1E |
| --- | --- |
| FIG. 1B | FIG. 1F |
| FIG. 1C | FIG. 1G |
| FIG. 1D | FIG. 1H |

RESCUE ASSIST SAFETY SYSTEM

FIELD OF THE INVENTION

This invention relates to apparatus for providing enhanced exit or removal of an operator and/or passenger from an automobile in the event of a motor vehicle accident, by means of an electronic over electromagnetic device which, when triggered, will result in the automatic unlocking of power locked doors and the automatic unrolling of rolled up power windows.

BACKGROUND OF THE INVENTION

North American automobile owners, generally, prefer larger and heavier cars. Because of their weights and speed, automobiles pose serious safety problems. Automobile producers regularly implement engineering changes stemming from the need to increase safety or energy efficiency. Since 1985, an increasing number of motor vehicles have been equipped with power windows and power door locks. Once considered optional accessories, power door locks and power windows are now assembled on approximately 60% of all new motor vehicles. These added features provide the operator with a quick and convenient means for locking and unlocking the doors and for rolling and unrolling of the windows.

The power window feature is operational when the key is set in the run position and the accessories are receiving power from the battery. The power door lock feature is operational, regardless of the ignition key's position, as long as the motor vehicle is receiving power from the battery. In addition, many newer vehicles have a safety feature installed to cause the doors to lock when the vehicle reaches a predetermined speed.

As a result of the installation of power windows and power door locks in most newly built automobiles, two new safety hazards now exist.

In the event of an accident, resulting in the incapacitation of the vehicle's electrical power supply, the conscious motor vehicle operator is often unable to unlock the doors or roll down the windows. The operator and passengers are still able to unlock the doors manually provided that there is no child safety lock engaged. However, the operator and passengers are not able to roll down the windows. This provides a serious safety concern for the conscious operator and passengers, in the event of a structural damage to the door frames or door posts which is significant enough to prevent the manual opening of the doors from the inside. In the past, the only remedy for this situation was the breaking of a window from the inside. This was only possible if the proper tool was accessible.

In the event of an accident that results in the physical incapacitation or loss of consciousness of the vehicle operator and/or the passengers, the operator and/or the passengers are often unable to unlock the doors or roll down the windows. This represents a serious safety concern for the rescue personal wishing to access the injured persons if the doors are locked and the windows are rolled up. In the past, the only remedy was the manual breaking of a window from the outside or the use of the Jaws of Life™. However, the breaking of the motor vehicle window from the outside is likely to exacerbate any preexisting injuries, and the force of shattering glass may, on its own, inflict personal injury on the occupants. The utilization of the Jaws of Life™ is limited by the response time of the search and rescue personnel and/or the fire department.

These safety concerns multiply when there is the added danger of fire, submersion, vehicle roll over or explosion.

The autonomic nervous system response to immediate, life threatening danger, is the flight or fight response. History has demonstrated that the typical motor vehicle operator and/or passenger response to entrapment in an automobile in unsafe circumstances is panic.

Example of vehicle exit systems available in the prior art to unlock power door locks or/and roll down power windows following an accident are described in the following documents:

U.S. Pat. No. 4,381,829 issued on May 3, 1983 to B. Montaron;

U.S. Pat. No. 4,785,907 issued on Nov. 22, 1988 to K Aoki et al.

U.S. Pat. No. 5,327,990 issued on Jul. 12, 1994 to A.B. Busquets;

U.S. Pat. No. 5,547,208 issued on Aug. 20, 1996 to J W Chappell et al.

U.S. Pat. No. 5,574,315 issued on Nov. 12, 1996 to H J Weber;

Although several vehicle emergency exit systems are available in the prior art, it is believed that a need still exists for a better system to reduce the incidence of delayed medical intervention, drowning, smoke inhalation and burns, now occurring as a result of entrapment of people in automobiles with power door lock and power window features.

SUMMARY OF THE INVENTION

The rescue assist safety system of the present invention (RAS System) is designed to provide an immediate and visible escape route from the damaged vehicle and by providing safer and easier access to passengers by medical and rescue personal. The RAS System is provided by the installation of an electronic over electromagnetic device within the existing circuitry of a motor vehicle, during the initial assembly of the vehicle, or on a used motor vehicle by a licensed automotive mechanic. Unless the criteria for operation of the RAS System are met, the installation of the RAS System does not interfere in any way with the normal operation of the motor vehicle. The operator and/or passengers have unimpeded use of the power window and power door lock features.

The RAS System is designed to operate during an automobile accident whereby the following criteria are met:

A. Moderate to high speed collision, with impact in any direction, with any solid object;

B. Any event that causes the motor vehicle to roll onto its side, onto the roof, or to stand on end;

C. Any event that causes the motor vehicle to be submerged in a body of water of sufficient depth to trigger the device;

D. A fuse panel fire or fire in the engine compartment or anywhere a fire sensor is mounted.

DETAILED DESCRIPTION OF THE PREFERRED EMBODIMENT

Figures 1, 2, 3:
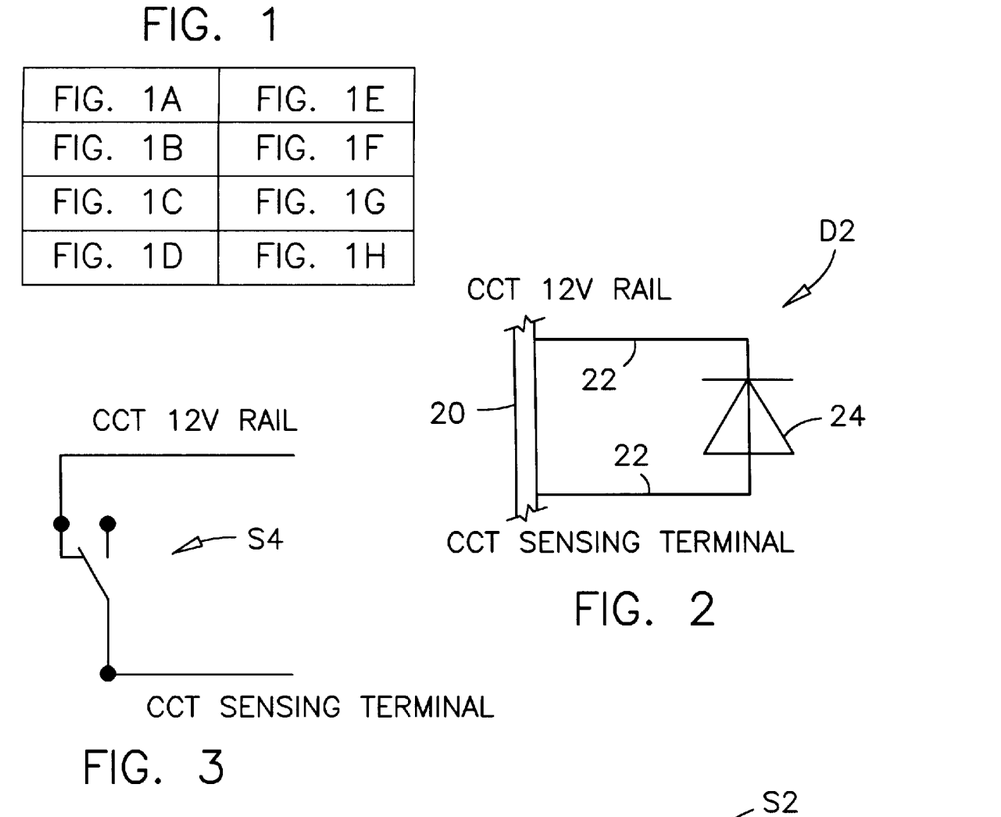
FIG. 1 is a diagram of the RAS System's circuit.
FIG. 2 is a schematic illustration of the immersion sensor comprised in the RAS system's circuit.
FIG. 3 is a schematic illustration of the fire sensor comprised in the RAS system's circuit.
Figure 1A:
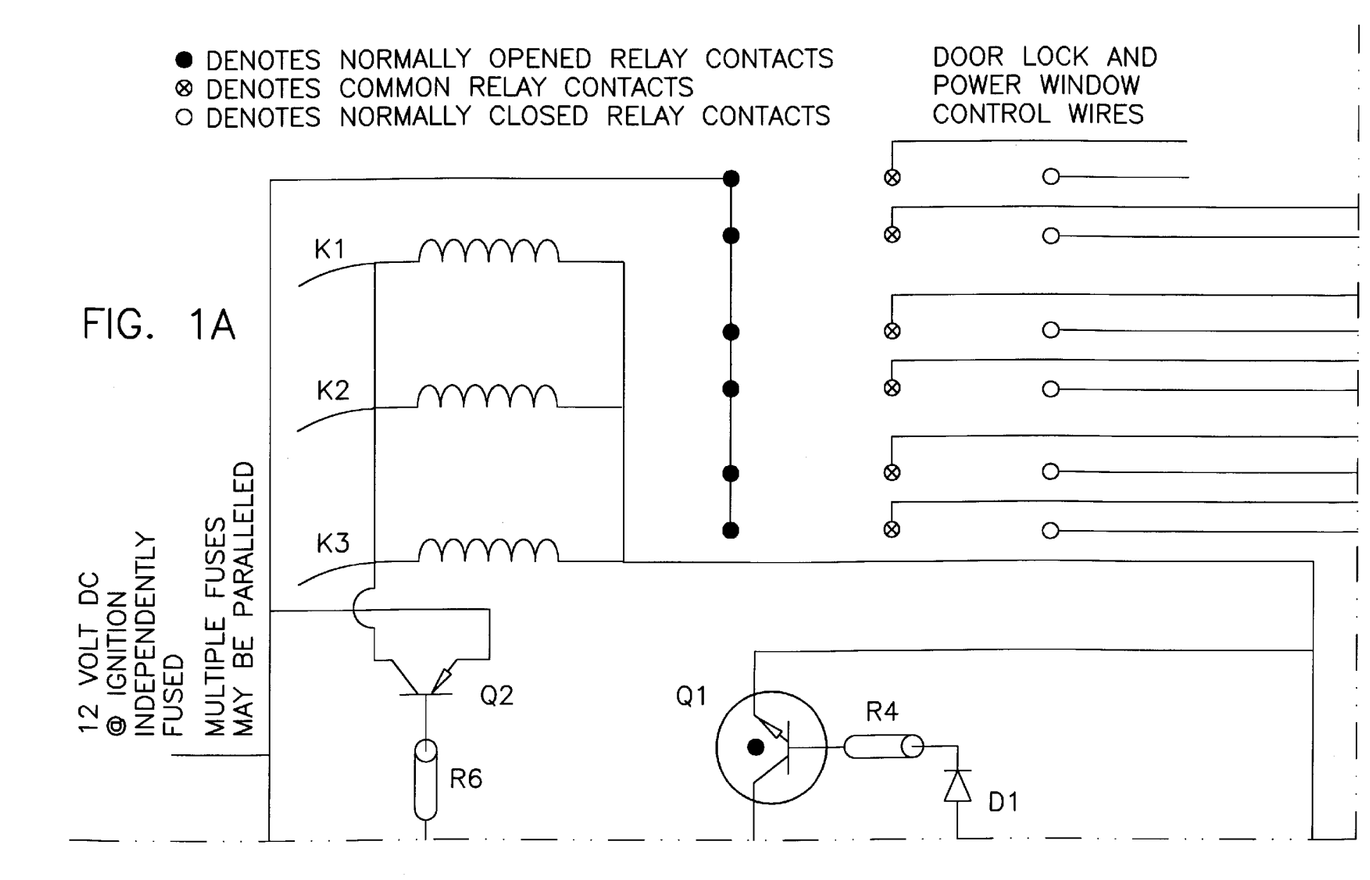
Figure 1B:
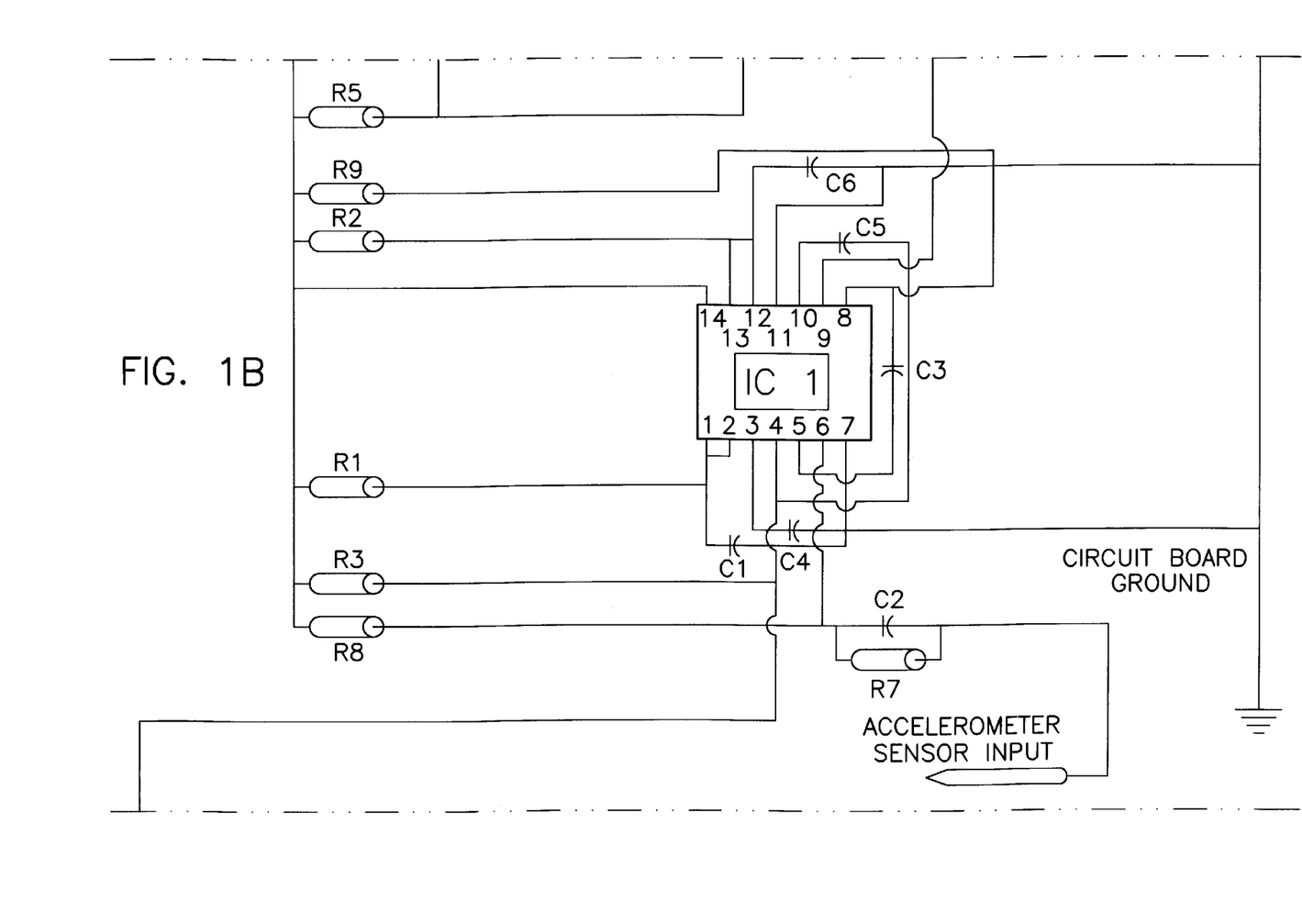
Figure 1C:
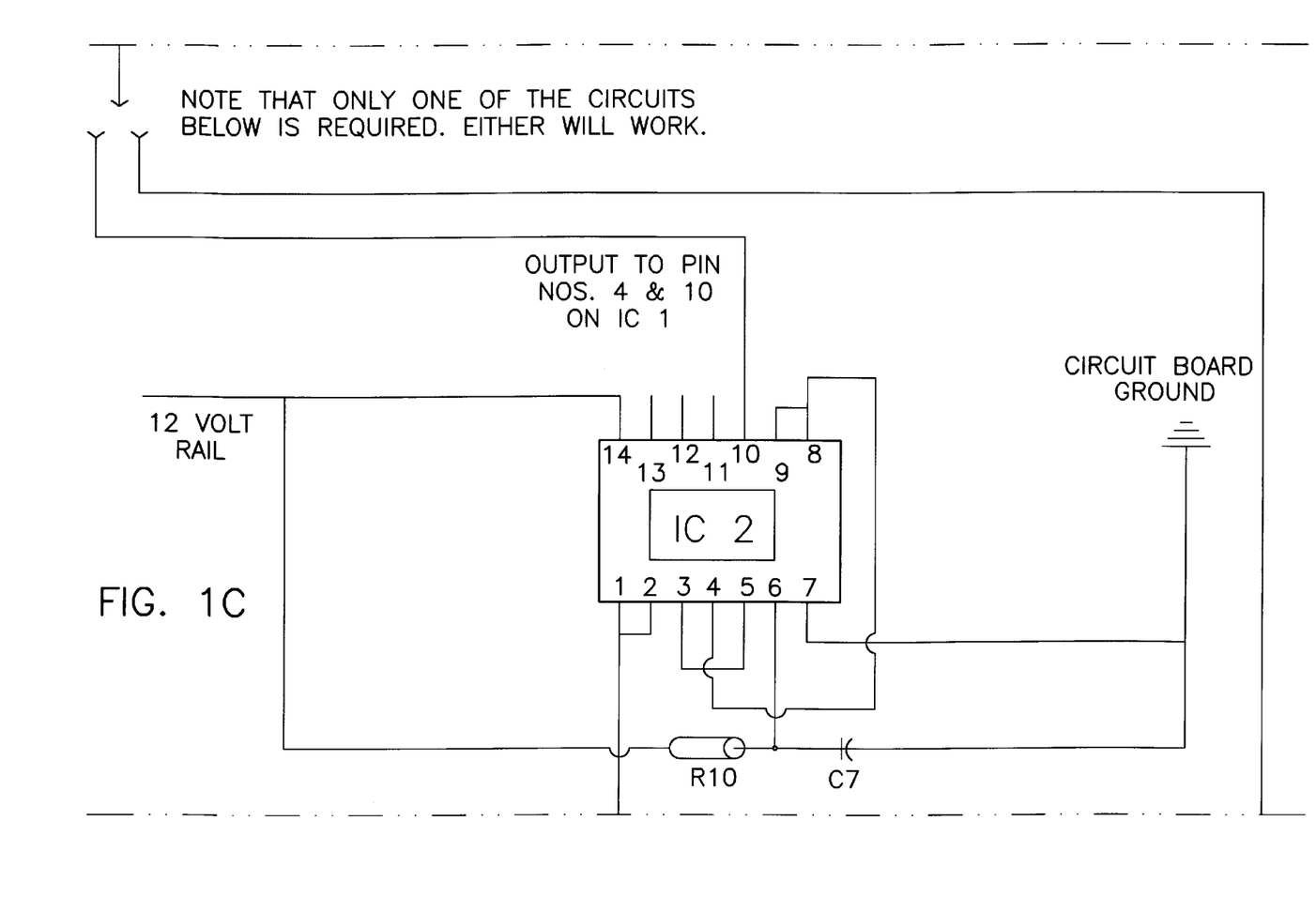
Figure 1D:
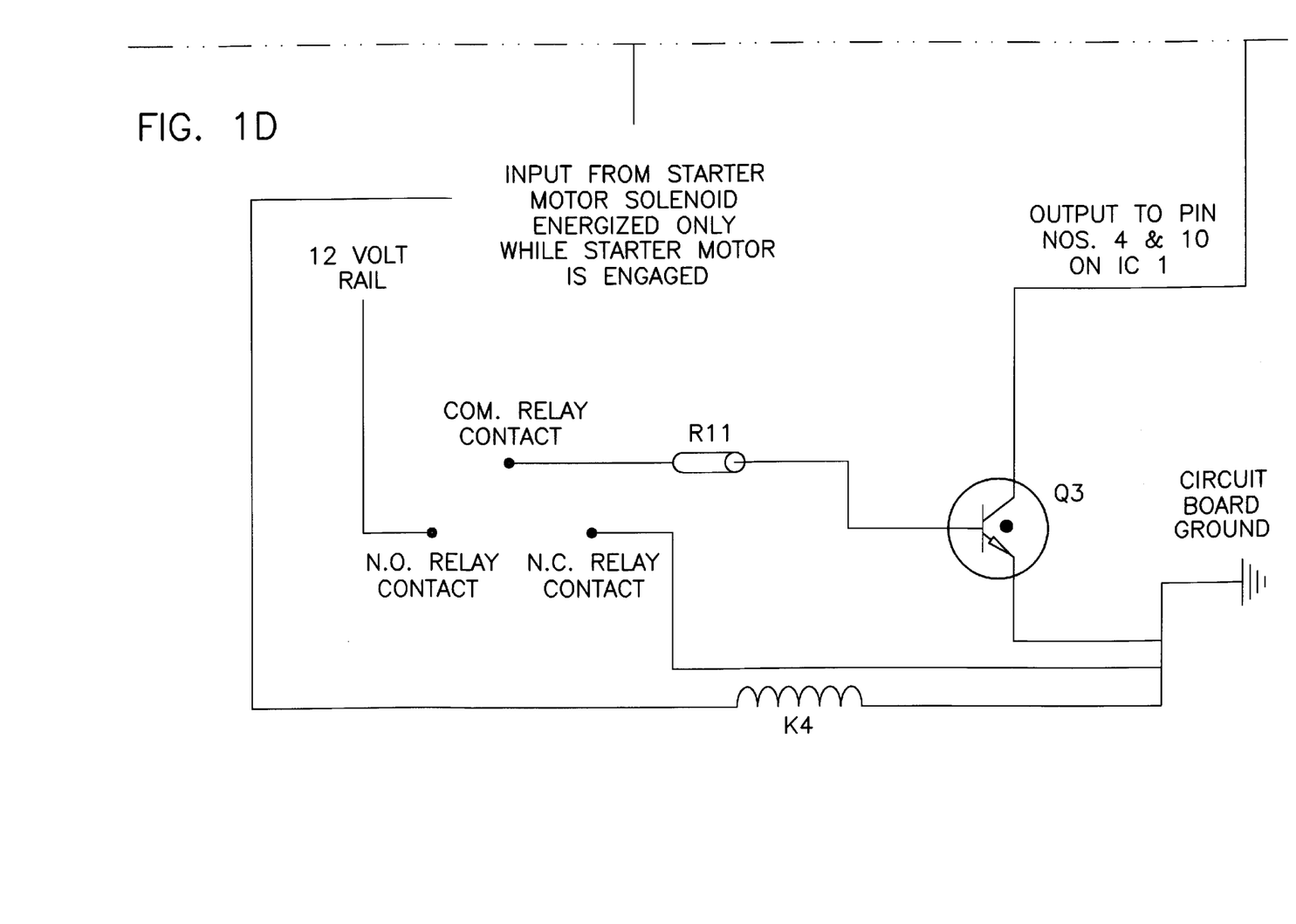
Figure 1E:
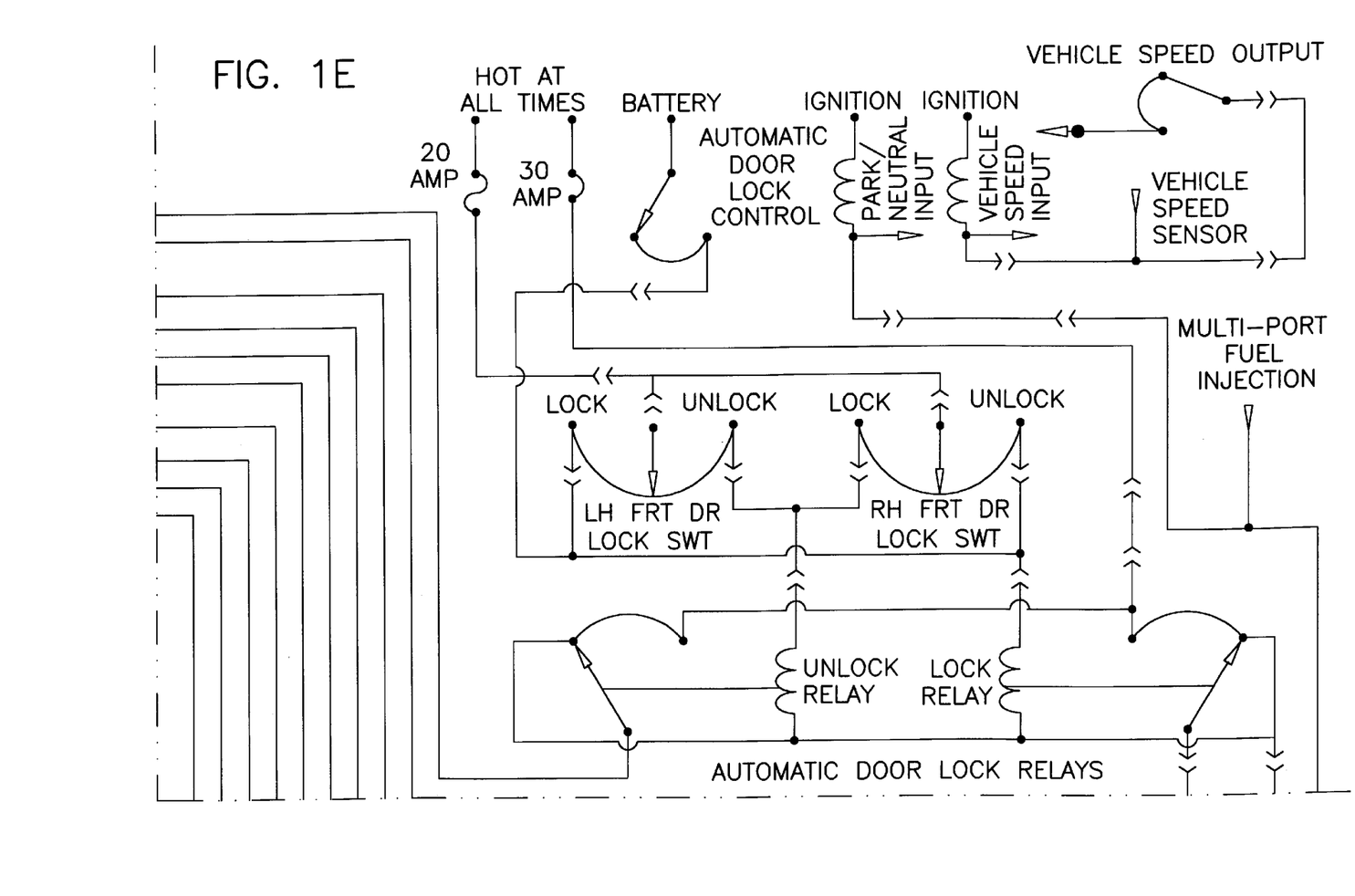
Figure 1F:
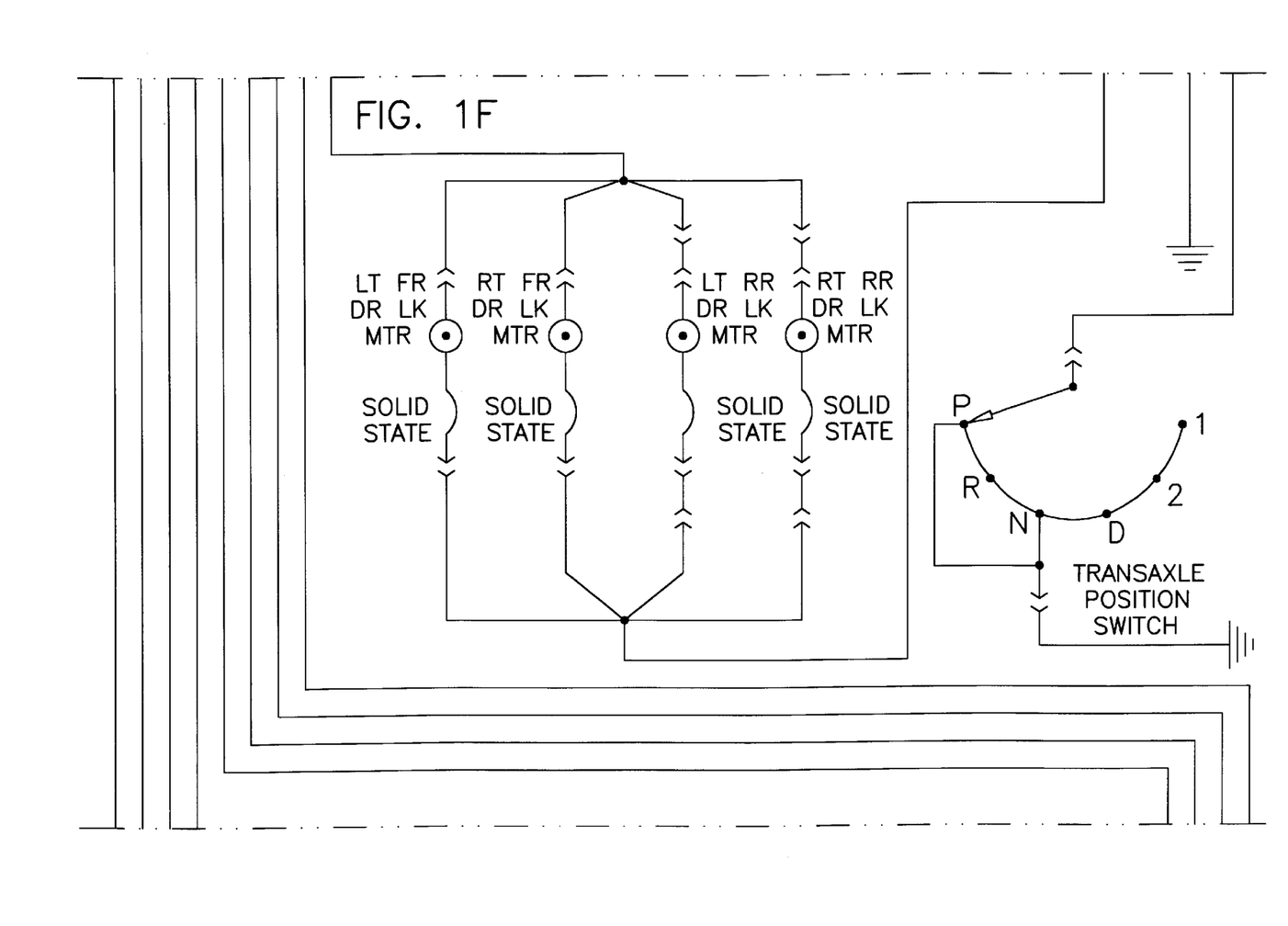
Figure 1G:
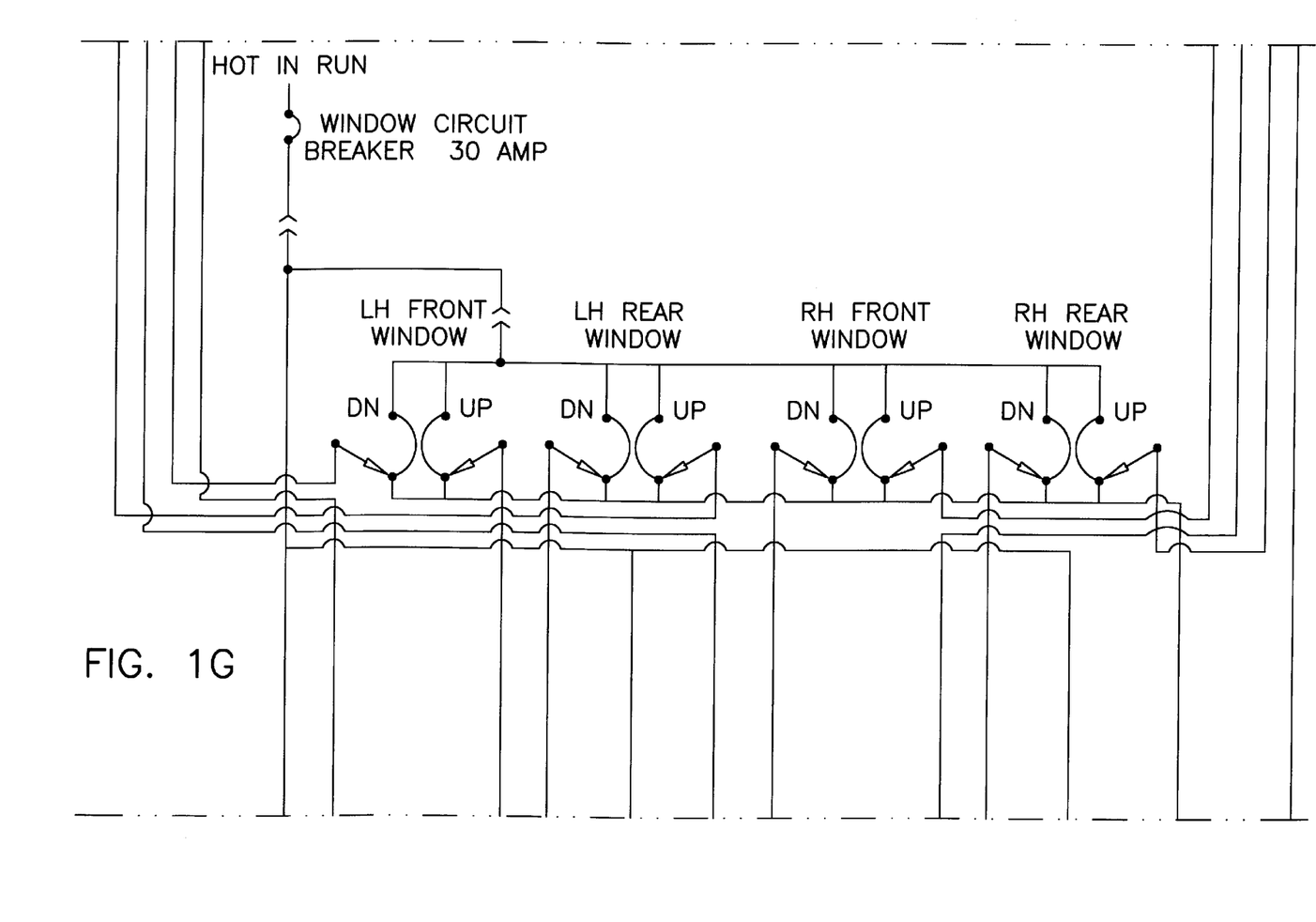
Figure 1H:
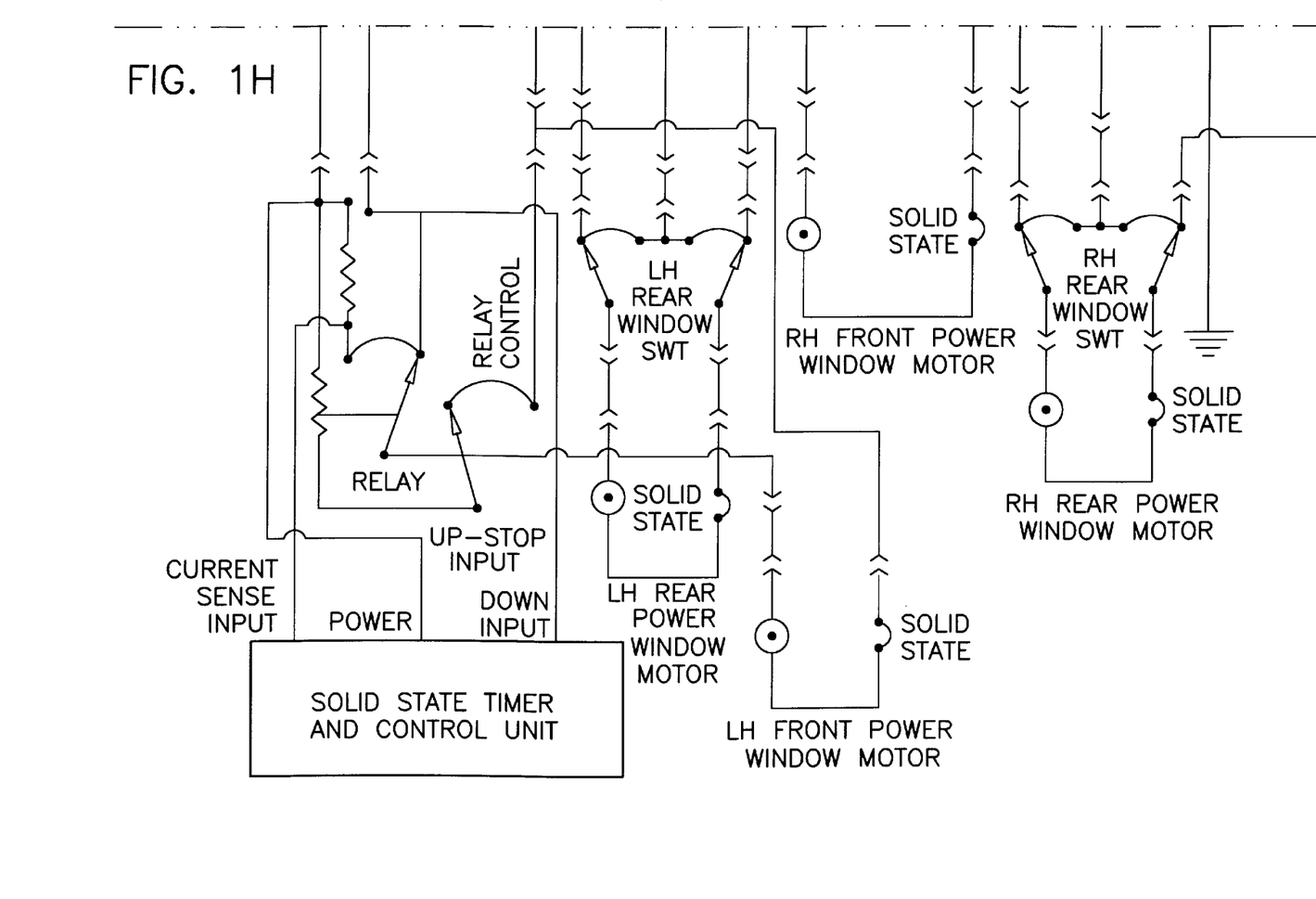

In the preferred embodiment, the immersion sensor D2, is a reverse biased diode encased in a waterproof box, open at the top. It is mounted under the hood high enough so that it cannot be immersed by driving through a puddle or spray. It's working voltage is supplied from the printed circuit board 20. When it is immersed in water, fresh water or salt water, it is shorted out to produce a closed circuit, allowing the 12 volt signal to appear on the RAS system, and causing the RAS system to energize the relays K1 to K3, opening the vehicle's doors and windows without a time delay.

The lead wires 22 of the diode are kept at a same distance by the semiconductor nodule 24, or the diode head. The diode's mounting provides a reliable mounting that can endure many years of vibration and harsh conditions when mounted in the engine compartment of a motor vehicle for example.

As mentioned above, the diode D2 is connected to the circuit in a reverse biased mode. Therefore an operation of the vehicle immersion sensor D2 can be periodically verified if desired, during a self test procedure for example, by verifying the continuity of the diode.

The working voltage from the printed circuit board is supplied to one or more fire detectors S4 micro-switches activated by fused links, depending on the location of the fire. S4 supplies a high voltage to the RAS system, which in turn energizes relays K1 to K3, opening doors and windows with no time delay.

Figure 4:
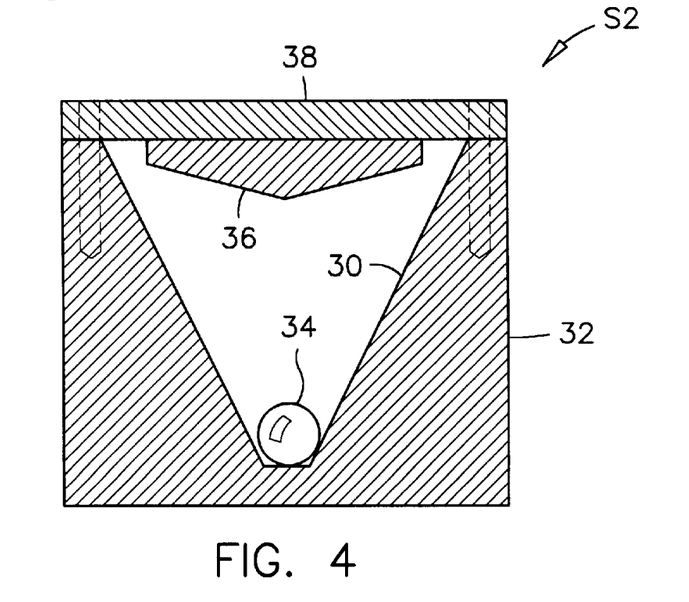
FIG. 4 is a cross-section view of the inversion sensor comprised in the RAS system's circuit.

The inversion sensing switch S2 consists of a conductive metal path to ground. The device comprises a cone-shaped cavity 30 in the center of the base 32, that narrows to the bottom. There is a ¼ ball bearing 34 inside the switch. There is also provided an upper cone-shaped contact disc 36. The disc is mounted to the underside of a cover plate 38. The contact disc 36 is machined from the same material as the base or body assembly 32. The cover plate is made of a non-conductive material to keep the circuit in its static state.

Figure 5:
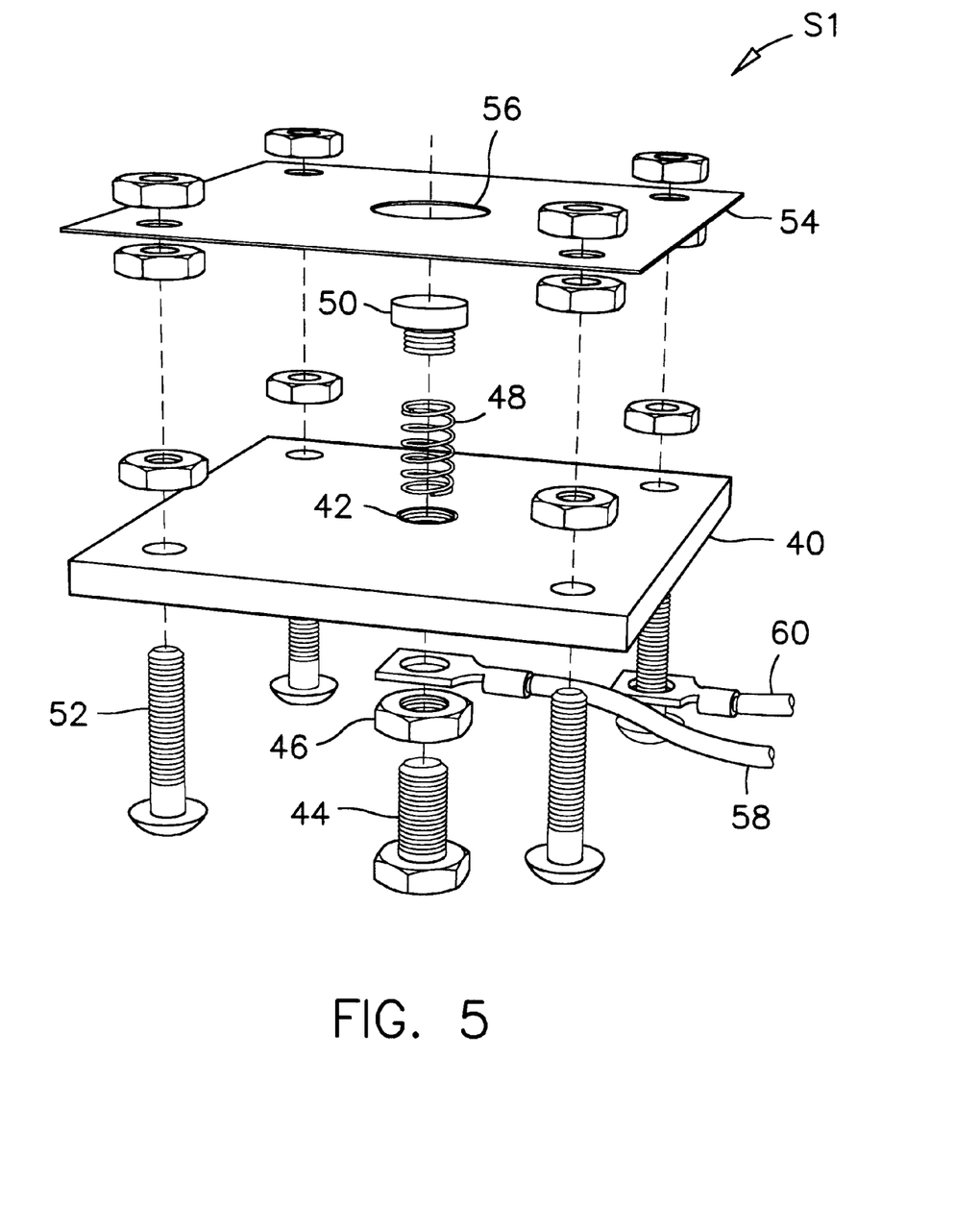
FIG. 5 is an exploded view of the impact sensor comprised in the RAS system's circuit.

The impact sensing switch is a mechanical device used to detect a sudden change in velocity of a moving object, in any direction, on a single plane.

The impact sensing switch is designed and built to endure the harshest conditions. It contains a sensor with high reliability and durability which is essential for harsh environments. The impact sensing switch comprises essentially a base 40 made of a non-conductive material. A helicoil 42 is mounted in the center of the base 40 to strengthen the threads cut in the base. A screw 44 with a jam nut 46 is wound in the helicoil from the bottom of the base. A spring 48 is wound over the threads of the screw, which allows the spring to protrude from the top of the base. There is a small weighted mass 50 attached to the top end of the spring. There are four screws 52, one at each corner of the base, mounted in the same direction as the spring 48. A contact plate 54 which is made from a conductive material and has a central hole 56 wide enough to allow the small weighted mass 50 to protrude into it, is mounted on the top ends of the screws 52, to a height that allows the mass at the end of the spring to contact the plate when the spring is sufficiently displaced from its neutral position. A power wire 58 is connected to the screw 44 in the center of the base to positively charge the spring 48 and mass 50 assembly prior to contact with the contact plate 54. A signal wire 60 extends from the contact plate 54 to a detection circuit.

When there is a change in velocity with sufficient force to overcome the strength of the spring, the spring displaces in the opposite direction of the change in velocity, and the weighted mass attached to the top end of the spring touches the contact plate to close the sensing circuit. In the event of a collision from any direction, which results in a sudden change in velocity, the impact sensing switch S1 causes a signal which can be used in any detection circuit.

In the preferred embodiment, the impact sensing switch S1 transmits a ground signal to the input of an integrated circuit IC1. This ground signal triggers the first stage of a cascaded timer function in IC1. After a predetermined delay, the circuit passes 12 volts DC from the vehicle's ignition system to the relays K1 to K3, energizing them and causing all door locks to unlock and windows to roll down.

False triggering of the circuit is prevented by a second integrated circuit IC2, which is a Quad dual Nand gate. The gates are connected so that one input is from a timer circuit, which provides a delay on power up and causes the first integrated circuit IC1 to be inhibited during power up. The other input is a 12 Volt DC signal from the starter motor. This signal is only present when the starter is engaged, which also causes the IC1 to be inhibited from operation during starting of the vehicle's engine.

What is claimed is:

1. An electronic device for automatically rolling down power windows and unlatching power door locks of a motor vehicle in the event of an accident, said electronic device comprising vehicle immersion detecting means for triggering an operation thereof;

said vehicle immersion detecting means comprising a circuit board and a diode connected to said circuit board in a reverse biased mode; said diode comprising a pair of lead wires connected to said circuit board;

such that said lead wires are usable for detecting water there-between, and such that a testing of said vehicle immersion detecting means is doable by verifying a continuity of said diode.

2. The electronic device as claimed in claim 1, wherein said diode further comprises a semiconductor nodule connected to said lead wires such that said lead wires are reliably kept apart a set distance by said semiconductor nodule.

3. The electronic device as claimed in claim 1, further comprising collision detecting means for triggering an operation thereof.

4. The electronic device as claimed in claim 3, further comprising fire detection means for triggering an operation thereof.

5. The electronic device as claimed in claim 4, further comprising vehicle inversion detecting means for triggering an operation thereof.

* * * * *